AUTOMATIC ARC WELDER WITH LOW IDLING VOLTAGE
Filed Jan. 6, 1954
Fig. I.
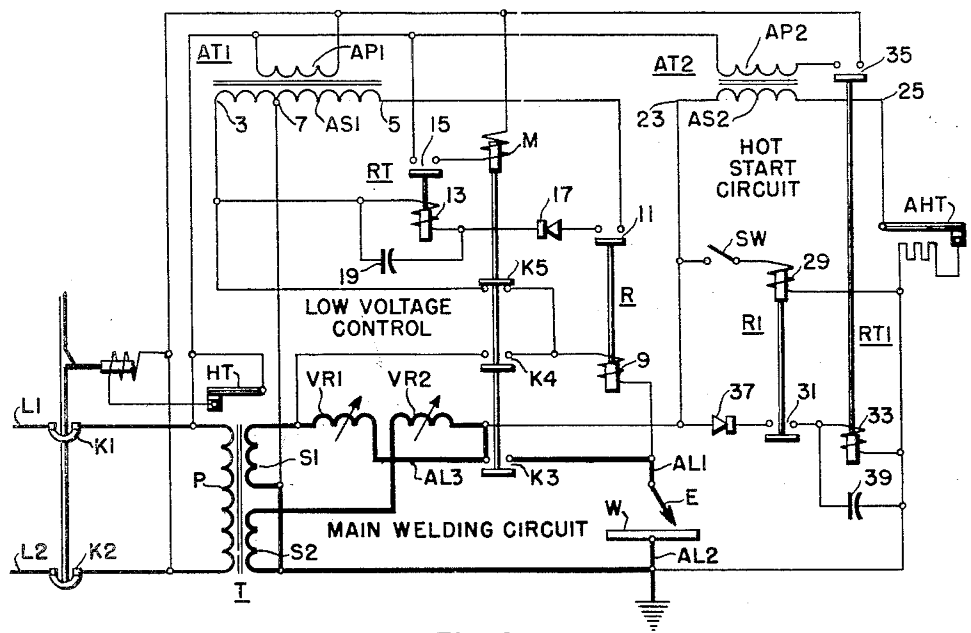
Fig. 2.
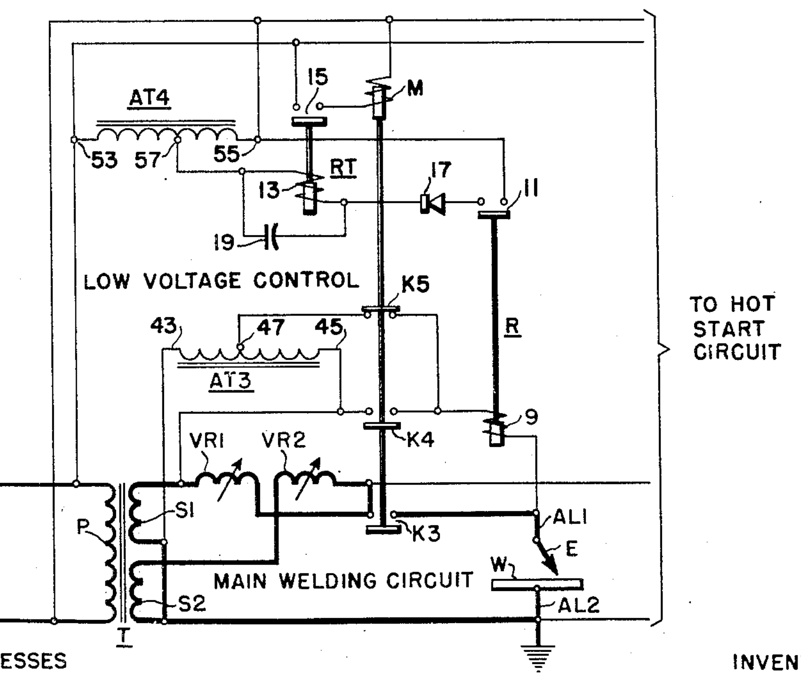
WITNESSES
Edwin E. Bassler
Leon J. Laza
INVENTOR
Ray V. Lester
BY
Wynne Diamond
ATTORNEY 2,769,118
Patented Oct. 30, 1956

2,769,118

AUTOMATIC ARC WELDER WITH LOW IDLING VOLTAGE

Ray V. Lester, Kenmore, N. Y., assignor to Westinghouse Electric Corporation, East Pittsburgh, Pa., a corporation of Pennsylvania Application January 6, 1954, Serial No. 402,564

20 Claims. (Cl. 315—174)

This application is a continuation-in-part of my application Serial No. 385,067, filed October 9, 1953. The earlier application discloses arc welding apparatus including hot-start facilities and will be hereinafter called the hot-start application. The hot-start application is incorporated in this application by reference.

The invention of this application relates to electric discharge apparatus and has particular relation to arc welders.

In its specific aspects, this invention concerns itself with arc welders for welding by hand. In using such welders the operator may weld continuously for time intervals of reasonable duration (breaking the arc as in tack welding or skip welding), to change electrodes, or for other purposes, for short time intervals between welding intervals.

While he is using the apparatus the body of the operator may come into electrical contact with the welding electrode and the work, and unless there are protective facilities the operator may suffer electrical shock. Since the operator wears insulative gloves, the chances of shock exists not during the above described short intervals when the arc is interrupted for a short time but during large intervals between complete welding operations when the operator may remove the gloves to change work or for other reasons.

It is the experience of the art that it is not practicable to eliminate this danger of electrical shock by providing a switch which may when necessary be operated to open the circuit. The difficulty with this expedient is that the operator tends to forget to open the switch and shock occurs, because the operator is accustomed to work with an open switch, the danger of shock is enhanced.

It is accordingly desirable that facilities be provided for protecting the operator against electrical shock while at the same time availing to him means for starting the arc at will without operating an external switch. These facilities should be so conserved that once the arc is started it should not be necessary to pass through a complete starting operation following each above mentioned short interruption. Protective control means of this type, which will be called hereinafter low voltage control, is included in arc welders in accordance with the teachings of the prior art. But, it is not entirely satisfactory. In certain of this prior art apparatus the low voltage control consists of a relay system tapped at a low voltage point into the secondary of the welding transformer so as to derive a low voltage potential for starting from this secondary. This low voltage control has the disadvantage that it requires that external conductors be connected to the turns of the welding transformer which are of large cross-sectional area. Where these turns are composed of copper, difficulty is encountered in connecting the external conductors. Where the turns are composed of aluminum, as is the situation in the preferred practice of my invention, the connection of external conductors to the turns becomes a serious problem.

The practice has also been followed, in accordance with the teachings of the prior art, to provide a separate transformer for the low voltage control. Such a transformer is, for example, shown in Croco Patent 2,449,456. While the apparatus disclosed in the Croco patent has been found to operate satisfactorily, it has the disadvantage that it includes a relatively complex relay system including a costly time delay relay.

It is accordingly an object of my invention to provide an arc welder including low voltage control of simple and low cost structure which does not require the tapping of external conductors into the windings of the welding transformer.

Another object of my invention is to provide such apparatus including a time delay facility of simple and low cost structure.

A further object of my invention is to provide an arc welder including hot-start and low voltage control in which the operation of the hot start and of the low voltage control shall be properly coordinated.

In accordance with my invention, I provide an arc welder having low voltage control, the power for which is derived from an auxiliary transformer. This transformer has low voltage connections which are, during the standby condition of the welder, connected in a series circuit with the coil of a low voltage relay and the load conductors through which the welding current flows so that when the electrode and work are engaged at the start of a welding operation this relay picks up. The low voltage control also includes a second relay supplied from the auxiliary transformer through a rectifier. The coil of this second relay has a substantial resistance and a capacitor is connected in parallel with the coil. The time constant of the capacitor and the resistance of the relay is of the order of three seconds. The relay picks up immediately on being energized but drops out in a time interval on the order of three seconds after the current to it from the transformer is interrupted.

In the standby condition of the apparatus, in accordance with my invention, the connection between the main power supply for welding and the load conductors is interrupted by a contactor or switch means. This switch means is closed when the second relay is actuated. The second relay is, in its turn, actuated when the first relay is actuated and the latter is actuated when the electrode and work are engaged during the welding operation. The second relay holds the switch means closed so long as it is closed since it drops out of the order of three seconds after the current flow from the source to it is interrupted the starting system need not be operated after the short pause intervals intervening in a welding operation.

Facilities are also provided in the apparatus in accordance with my invention for disconnecting the low voltage connections from the load conductors when the switch means is actuated and for locking in the coil of the first relay once the switch means is actuated.

It is seen that with this apparatus a low voltage is maintained between the electrode and the work during the standby condition of the apparatus. This low voltage is adequate to actuate the first relay which, in turn, actuates the second relay and the latter, in turn, actuates the switch means. Once the switch means is actuated, the low voltage is disconnected from the load conductors. If, during the welding operation, the arc is interrupted, the first relay drops out but the second relay remains actuated for a time interval of the order of three seconds. This time interval is sufficient to permit the operator to skip weld or to change electrodes, but is so short that if the interruption continues for a longer time interval the welding supply voltage is interrupted and the low voltage is again impressed between the electrode and the work.

Within the broader aspects of my invention the timing circuit including the capacitor and the rectifier could be connected in circuit with the coil of the first relay, the contact of the first relay could be connected to energize the actuating means for the switch means and the second relay could be entirely eliminated. But, the low voltage relays available in the art have a relatively low resistance and would require a very large capacity to afford the necessary time delay. While this capacity would not be required to withstand the higher voltage which the capacitor connected across the coil of the second relay withstands, it would be considerably more costly than the lower magnitude capacitor connected across the high resistance coil.

The arc welding apparatus also includes a hot start circuit. This circuit is supplied from a second auxiliary transformer which at one terminal is connected to the work and at the other terminal is connected to the junction of the main supply conductor and the switch means. The hot start circuit is actuated during the standby condition of the arc welding apparatus but since the auxiliary transformer is maintained disconnected from the load conductors by the switch means the potential of the hot start auxiliary transformer does not endanger the operator.

The novel features that I consider characteristic of my invention are discussed generally above. The invention itself, both as to its organization and to method of operation together with additional objects and advantages thereof, will be understood from the following description taken in connection with the accompanying drawing, in which:

Figure 1 is a circuit diagram of an embodiment of my invention, and

Fig. 2 is a circuit diagram of a modification of my invention.

*Description.—Figure 1*

The apparatus shown in Figure 1 includes a main welding circuit, a low voltage control and a hot-start circuit. This apparatus is supplied from supply conductors or buses L1 and L2 which may derive their power from an alternating current commercial supply of any available voltage such as 220, 440, 550 or even higher.

The main welding circuit includes a pair of load conductors AL1 and AL2 connected, respectively, to the welding electrode E and the work W. Power is supplied to the welding conductors through a welding transformer T having a primary winding P and secondary windings S1 and S2. This transformer may be of any structure but the turns are preferably composed of aluminum and have the dimensions disclosed on page 11 of my earlier application.

The primary P is connected to the conductors L1 and L2 through the contacts K1 and K2, respectively, of a shunt trip circuit interrupter of the thermal type. The thermal element HT of this interrupter is preferably embedded in one of the secondary windings S1 or S2 of the transformer T. The primary is preferably provided with a number of taps so that the transformer T may be connected to supplies of different voltages available.

One terminal each of the secondaries S1 and S2 are connected together and to the load conductor AL2. The other terminal of each secondary S1 and S2 is connected through a variable reactor VR1 and VR2, respectively, to a common conductor AL3. The transformer and the reactors VR1 and VR2 may be combined into a transformer reactor as disclosed in an application Serial No. 357,321, filed May 25, 1953, to Emil F. Steinert, Harry J. Bichsel and Ray Verne Lester. In accordance with the preferred practice of my invention, the reactors VR1 and VR2 are provided as separate windings connected by means of a suitable connector (not shown) to the secondaries S1 and S2, respectively.

The conductor AL3 is adapted to be connected to the load conductor AL1 through a normally open switch means or contactor K3 This switch means K3 may be closed by operation of a coil or solenoid M. The solenoid M also actuates an additional normally open switch means K4 and normally closed switch means K5.

The low voltage control includes an auxiliary transformer AT1 having a primary AP1 and a secondary AS1. The turns ratio of the transformer AT1 is such that an open circuit voltage of approximately 80 volts R. M. S. is available between the terminal taps 3 and 5 of the secondary AS1 also has an intermediate tap 7 between which and the terminal tap 3 a potential of the order of 30 volts R. M. S. is available. The above stated voltages are of course, only illustrative of the voltages which may appear between the stated terminals. The important fact is that the voltage between the terminals 7 and 3 should be so low as not to present any danger to the operator.

The low voltage control also includes relays R and RT. Relay R has a coil 9 and normally open contact 11. Relay RT has a coil 13 and normally open contact 15. Coil 9 is connected in circuit with the terminals 7 and 3 of secondary AS1. This circuit includes the terminal 7, the conductor AL2, work W, electrode E, the conductor AL1, the coil 9, the switch means K5, and the terminal 3. The coil 9 is of relatively low impedance but is such that the relay may be operated from a low voltage such as is available between the terminals 7 and 3 of the secondary AS1. The coil 9 is also adapted to be connected through contact K4 to the junction of one of the terminals of the secondary S1 and the reactor VR1. With the contact K4 closed, the potential of this secondary S1 is impressed through the coil 9 between the electrode E and the work W so that if there is an arc between the electrode E and the work W coil 9 is in actuated condition.

The coil 13 of the second relay RT is of the relatively high impedance type and the relay is adapted to be operated from a higher voltage than the first relay R, for example, a voltage such as is available between the terminal taps 5 and 3. This coil 13 is adapted to be connected between the terminal taps 5 and 3 through the normally open contact 11 and a rectifier 17. Across the coil 13 a capacitor 19 is connected. While the time constant of the resistance of the coil 13 and the capacity 19 may have any desired magnitude, it is preferred that it be of the order of three seconds. The contact 15 of the relay RT is adapted to connect the solenoid M across the terminals of the primary P and thus, in effect, across the supply conductors L1 and L2.

The hot start circuit is similar to the circuit disclosed in my earlier application. It includes an auxiliary transformer AT2 having a primary AP2 and a secondary AS2. The open circuit voltage of this secondary AS2 is substantially equal to the open circuit voltage of the secondaries S1 and S2 of the transformer T. The secondary AS2 has terminals 23 and 25. Terminal 23 is connected to the junction of the switch means K3 and the conductor AL3. This terminal is thus maintained disconnected from the conductor AL1 by the switch means K3 which is normally open. The terminal 25 is connected through an overload thermal switch AHT to the conductor AL2. The hot start circuit also includes a pair of relays R1 and RT1. The relay R1 has a coil 29 and a normally open contact 31. The relay RT1 has a coil 33 and a normally open contact 35. The coil 29 is connected to the terminal 23 through a switch SW which is closed when the hot start circuit is to be used. The coil 29 is also connected through the overload switch AHT to the terminal 25. The coil 33 of the relay RT1 is connected to the terminal 23 through a rectifier 37 and the normally open contact 31 of the relay R1. The coil 33 is also connected through the overload switch AHT to the terminal 25. A capacitor 39 is connected in parallel with the coil 33. The coil 33 is of substantial resistance and the capacitor 39 is so selected that the time constant of the capacitor 39 and the resistance of the coil 33 is of the order of one-half second. The primary AP2 is adapted to be connected across the terminals of the primary P and thus between the conductors L1 and L2 through the normally open contact 35 of the relay RT1.

*Standby.—Figure 1*

In the stand-by condition of the apparatus shown in Figure 1 the contacts K1 and K2 are closed and power is supplied to the primary P. The secondaries S1 and S2 are disconnected from the electrode E and the work W by the open switch means K3. The taps 7 and 3 are connected to the electrode E and the work W through the normally closed switch means K5 and thus there is a low potential between the electrode E and the work W. The circuit through the coil 9 is open because the electrode E is disengaged from the work W. Contact 11 is, therefore, open. The circuit of coil 13 of relay RT is then open and contact 15 is open so that solenoid M is deenergized.

If the hot start circuit is to be used, the switch SW is closed. When contactors K1 and K2 are initially closed then the potential of the secondaries S1 and S2 is impressed across the coil 29. Relay R1 is then actuated, closing contact 31. Relay RT1 is now actuated, closing contact 35. Power is thus available across secondary AS2 but the potential of secondary AS2 is not impressed between the electrode E and the work W because switch means K3 is open.

*Operation.—Figure 1*

When a weld is to be made the operator engages and then immediately disengages the electrode E and work W. The engagement of the electrode and the work completes the circuit through the coil 9 of relay R. Relay R picks up, closing contact 11 and thus closing the circuit through coil 13 of relay RT. Relay RT immediately picks up, closing the circuit through solenoid M. Switch means K3 and K4 are then closed and switch means K5 is open. Power is now available between the electrode E and the work W for welding, from the secondaries S1 and S2 of the transformer T.

When the electrode E is engaged with the work W the potential of the secondary AS2 is also impressed between the electrode E and the work W thus making available hot start current. At the same time, the potential across the coil 29 is decreased to a low magnitude so that relay R1 drops out, opening the circuit through the coil 33 of relay RT1. Relay RT1 is held actuated by the discharge of capacitor 39 for a time interval of the order of one-half second and during this time interval the hot start power is available.

When the operator disengages the electrode E from the work W he produces an arc. The firing of the arc is facilitated by the hot start circuit.

At this time, switch means K3 is closed and switch means K5 is open. At the now open switch means K5 the low potential between the taps 3 and 7 is disconnected from the electrode E and the work W. In addition switch means K4 is closed maintaining a lock-in circuit through the coil 9. Contact 11, therefore, remains closed, holding relay RT in actuated condition and maintaining solenoid M energized. The secondary S1 is of the high impedance type and because of the drop through this secondary by reason of the arc current the coil 9 is not subject to damage.

The potential drop across the arc is inadequate to maintain the relay R1 actuated and contact 31 remains open. After the network 39—33 times out, relay RT1 drops out, opening contact 35. The welding now proceeds.

If during the welding operation the operator should, for example, desire to change electrodes, he moves the electrode E away from the work W, extinguishing the arc. The circuit through coil 9 is now open and relay R immediately drops out, opening contact 11. Relay RT, however, is maintained actuated for a time interval of the order of three seconds by the discharge of capacitor 19. Solenoid M then remains energized, switch means K3 and K4 remain closed and switch means K5 remains open and the low voltage control is in condition for immediate use.

In addition, once the arc is extinguished, relay R1 is immediately actuated, closing contact 31 and actuating relay RT1 which, in turn, energizes transformer AT2. Hot start power is then available.

Within the time interval of three seconds the operator changes the electrode and engages the new electrode E and the work W and quickly disengages them. The circuit through coil 9 is now again closed, actuating relay R and the low voltage control is now reverted to the operational condition. When the operator removes the electrode E from the work W an arc is fired between the electrode E and the work W by the cooperative action of the secondaries S1 and S2 and the secondary AS2. Once the arc is struck, current flow to the relay R1 is again interrupted and after a short time interval the relay RT1 is deenergized and the welding again proceeds.

When the operator completes the welding operation he removes the electrode E from the work W extinguishing the arc. Relay R now drops out, opening the circuit through coil 12. After the network 19—13 times out, relay RT drops out, opening the circuit through the solenoid M. Switch means K3 and K4 are now open and switch means K5 is closed, reverting the low voltage control to the standby condition. When the arc is extinguished, relay R1 is actuated, closing contact 31 and actuating relay RT1 to revert the hot start circuit to the actuated condition.

The cut-out AHT assures that the hot start circuit, which is capable of supplying substantial power during only short time intervals is not damaged in situations in which the arc may fail to strike, the relay R1 may stick, the operator may hold the electrode E in engagement with the work too long or under other like circumstances.

*Component magnitudes*

In actual apparatus, in accordance with Fig. 1, which I have found to operate satisfactorily, the components of the main welding circuit and of the hot start circuit are as disclosed on page 11 of my earlier application except that the overload switch AHT, not shown in my earlier application, is a Klixon switch sold by Spencer Thermostat Co. In the low voltage control the transformer AT1 is so constructed that 80 volts are available between its terminal taps 3 and 5 and 30 volts between the taps 3 and 7 with 230 volts across the primary AP1. The primary AP1 may be provided with taps such that the voltages across the secondary are maintained when the power supply differs from 230 volts. The relay R is type PR1A manufactured by Potter Brumfield Co. The relay RT is type PR1528 also manufactured by Potter Brumfield Co. The solenoid M and its switch means K3, K4, K5 together are the Westinghouse contactor type NR. The capacitor 19 across the coil 13 has a magnitude of 243 microfarads. Since this capacitor need be designed to operate at 80 volts it is not costly. The elimination of the relay RT by introducing the timing across the coil 9 of relay R is not preferred because the coil 9 has a low resistance and is supplied with a low voltage and the capacitor necessarily would have a very high capacity. The operation of the relay RT directly from the power supply buses L1 and L2 is not preferred because the capacitor would then have to be designed to withstand a high potential and would be costly.

*Description.—Figure 2*

The apparatus shown in Figure 2 differs from the apparatus in Fig. 1 in the fact that the low voltage control instead of deriving its power from the auxiliary transformer AT1, as it does in the Fig. 1 system, derives its power from a pair of autotransformers AT3 and AT4, the former connected across the secondaries S1 and S2 and the latter across the primary P of transformer T.

The transformer AT3 has primary taps 43 and 45 and a secondary tap 47 between which and primary tap 43 a low voltage is available. Load conductor AL1 is connected to tap 47 through coil 9 and normally closed switch means K5. Load conductor AL2 is connected to tap 43. Transformer AT4 has primary taps 53 and 55 and secondary tap 57. The coil 13 of relay RT is connected in series with the secondary section 55—57 in a circuit which extends from tap 55 through contact 11, rectifier 17, coil 13 to tap 57. A potential of the order of 80 volts is thus available for the operation for the actuation of relay RT. The capacitor 19, being connected in parallel with the coil 13, is subjected only to the potential between the secondary section 55—57 of the transformer AT4.

*Standby.—Figure 2*

The apparatus shown in Figure 2 is maintained in the standby condition similar to the apparatus shown in Figure 1. In this case, with the electrode E disengaged from the work W, relay R is deenergized, relay RT is deenergized and solenoid M is deenergized so that switch means K3 and K4 are open and switch means K5 closed. The hot start circuit is similar to that of the Fig. 1 apparatus and is in the condition described for the Fig. 1 apparatus.

*Operation.—Figure 2*

The apparatus shown in Figure 2 operates in the same manner as the apparatus shown in Figure 1. When the electrode E is engaged with the work W, relay R is actuated closing contact 11 and actuating relay RT to energize solenoid M, closing switch means K3 and K4 and opening switch means K5. Power is supplied for welding through switch means K3, relay R is locked in through switch means K4 and the low voltage is disconnected from the electrode E and work W by now open contact K5. If the operator desires to stop welding, the electrode E is removed from the work extinguishing the arc and causing relay R to drop out. Relay RT and solenoid M remain energized for a time interval of the order of three seconds which is adequate to enable the operator to change electrodes.

*Conclusion*

The apparatus disclosed in this application includes hot start facilities and low voltage control facilities and is yet of relatively simple and low cost structure. The transformers AT1 and AT2 or AT3 and AT4 are of low cost requiring little insulation and being wound with low cost conductors. Relays R and RT and R1 and RT1 are also of the low cost type as are the capacitors 19 and 39 associated with these relays.

While I have shown and described certain specific embodiments of my invention, many modifications thereof are possible. My invention, therefore, is not to be restricted except insofar as is necessitated by the spirit of the prior art.

I claim as my invention:

1. Arc welding apparatus comprising a welding transformer having a primary and a secondary, an electrode conductor, a work conductor, a normally open main switch, means including said normally open main switch for connecting one terminal of said secondary to said electrode conductor, means connecting another terminal of said secondary to said load conductor, an auxiliary transformer having a primary and a secondary for supplying a hot-start impulse, a normally open auxiliary switch maintaining said auxiliary transformer deenergized, actuating means for closing said switch having a first supply conductor and a second supply conductor, means connecting said first conductor to the junction of said normally open main switch and said one terminal, means connecting said second conductor to said work conductor, and means responsive to current flow between said electrode conductor and said work conductor for closing said main switch.

2. Arc welding apparatus comprising a welding transformer having a primary and a secondary, a first load conductor and a second load conductor between which an arc is to be produced, normally open main switch means, means connecting said first conductor to one terminal of said secondary through said switch means, means connecting said second conductor to another terminal of said secondary, an auxiliary transformer having a primary and a secondary for supplying a hot-start impulse, means connecting one terminal of said last-named secondary to the junction of said switch means and said one terminal of said secondary of said welding transformer, means connecting another terminal of said secondary of said auxiliary transformer to said second conductor, normally open auxiliary switch means for maintaining said auxiliary transformer deenergized, means connected between said one terminal and said other terminal of said auxiliary transformer for closing said auxiliary switch means, and means responsive to current flow between said first and second conductors for closing said main switch means.

3. Arc welding apparatus according to claim 2 characterized by responsive means which is actuable by a low voltage and by a network, including a low voltage supply, for actuating said responsive means, said network being connected to said first and second conductors and being conducting when current flows through said first and second conductors.

4. Arc welding apparatus comprising a welding transformer having a primary and a secondary, a first load conductor and a second load conductor between which an arc is to be produced, normally open main switch means, means connecting said first conductor to one terminal of said secondary through said switch means, means connecting said second conductor to another terminal of said secondary, an auxiliary transformer having a primary and a secondary for supplying a hot-start impulse, means connecting one terminal of said last-named secondary to the junction of said switch means and said one terminal of said secondary of said welding transformer, means connecting another terminal of said secondary of said auxiliary transformer to said second conductor, one of said last-named connecting means including overload switch means for opening the connection of said connecting means on the occurrence of an overload, normally open auxiliary switch means for maintaining said auxiliary transformer deenergized, means connected between said one terminal and said other terminal of said auxiliary transformer for closing said auxiliary switch means, and means responsive to current flow between said first and second conductors for closing said main switch means.

5. Arc welding apparatus comprising a welding transformer having a primary and a secondary, a first load conductor and a second load conductor between which an arc is to be produced, normally open main switch means, means connecting said first conductor to one terminal of said secondary through said switch means, means connecting said second conductor to another terminal of said secondary, an auxiliary transformer having a primary and a secondary for supplying a hot-start impulse, means connecting one terminal of said last-named secondary to the junction of said switch means and said one terminal of said secondary of said welding transformer, means connecting another terminal of said secondary of said auxiliary transformer to said second conductor, normally open auxiliary switch means for maintaining said auxiliary transformer deenergized, means connected between said one terminal and said other terminal of said auxiliary transformer responsive to a voltage of predetermined magnitude between said last-named one terminal and said last-named other terminal, for closing said auxiliary switch means and for maintaining said auxiliary switch means closed for a predetermined time interval after the voltage between said last-named one terminal and said last-named other terminal falls below said predetermined magnitude, and means responsive to current flow between said first and second conductors for closing said main switch means.

6. An arc welder comprising a welding transformer having a primary and a secondary, a first load conductor and a second load conductor between which arc current is to flow, normally open switch means, means including said switch means for connecting one terminal of said secondary to said first conductor, means connecting another terminal of said secondary to said second conductor, current-actuable means for actuating said switch means, a first relay having a coil and normally open contact means, said coil having electrical resistance, a circuit for supplying current to said current-actuable means including said contact means, an auxiliary transformer having a primary and a secondary, said secondary having terminal taps and an intermediate tap, a second relay having a low voltage coil and normally open contact means, means for connecting in series, said first conductor, said second conductor, said low voltage coil, said intermediate tap and one of said terminal taps, rectifier means, means for connecting in series, said terminal taps, said normally open contact means of said second relay, said coil of said first relay and said rectifier means, a capacitor, and means for connecting said coil of said first relay in parallel with said capacitor, said capacitor and said resistance of said first relay having a time constant of the order of three seconds.

7. An arc welder comprising a welding transformer having a primary and a secondary, a first load conductor and a second load conductor between which arc current is to flow, normally open first switch means, normally open second switch means, normally closed switch means, means including said first switch means for connecting one terminal of said secondary to said first conductor, means connecting another terminal of said secondary to said second conductor, current actuable means for actuating said first switch means, said second switch means and said normally closed switch means, a first relay having a coil and normally open contact means, said coil having electrical resistance, a circuit for supplying current to said current-actuable means including said contact means, an auxiliary transformer having a primary and a secondary, said secondary having terminal taps and an intermediate tap, a second relay having a low voltage coil and normally open contact means, means for connecting in series said first conductor, said second conductor, said low voltage coil, said normally closed switch means, said intermediate tap and one of said terminal taps, rectifier means, means for connecting in series, said terminal taps, said normally open contact means of said second relay, said coil of said first relay and said rectifier means, means including said second switch means for connecting said one terminal to said low voltage coil, a capacitor, and means for connecting said coil of said first relay in parallel with said capacitor, said capacitor and said resistance of said first relay having a time constant of the order of three seconds.

8. An arc welder comprising a welding transformer having a primary and a secondary, a first load conductor and a second load conductor between which arc current is to flow, normally open switch means, means including said switch means for connecting one terminal of said secondary to said first conductor, means connecting another terminal of said secondary to said second conductor, current-actuable means for actuating said switch means, a first relay having a coil and normally open contact means, said coil having electrical resistance, a circuit for supplying current to said current-actuable means including said contact means, an auxiliary transformer having a primary and a secondary, said secondary having terminal taps and an intermediate tap, a second relay having a low voltage coil and normally open contact means, means for connecting in series, said first conductor, said second conductor, said low voltage coil, said intermediate tap and one of said terminal taps, rectifier means, means for connecting in series, said terminal taps, said normally open contact means of said second relay, said coil of said first relay and said rectifier means, a capacitor, and means for connecting said coil of said first relay in parallel with said capacitor.

9. An arc welder comprising power supply means having a first supply terminal and a second supply terminal, an auxiliary transformer having a secondary having first connections from which a low voltage is derivable and second connections from which a higher voltage is derivable, a first load conductor and a second load conductor through which the welding current flows, normally open switch means, means connecting said switch means between said first terminal and said first conductor, means connecting said second terminal and said second conductor, time delay relay means having coil means and normally open contact means, additional relay means having coil means and normally open contact means, means connecting in series said higher voltage connections, said last-named normally open contact means and said coil means of said time delay relay means, current responsive means for actuating said switch means to close, means including said normally open contact means of said time delay relay means for connecting said actuating means to said power supply means, and means for connecting in series said first connections, said coil means of said additional relay means and said first and second conductors.

10. An arc welder comprising power supply means having a first supply terminal and a second supply terminal, an auxiliary transformer having a secondary having first connections from which a low voltage is derivable and second connections from which a higher voltage is derivable, a first load conductor and a second load conductor through which the welding current flows, normally open switch means, means connecting said switch means between said first terminal and said first conductor, means connecting said second terminal and said second conductor, time delay relay means having coil means and normally open contact means, additional relay means having coil means and normally open contact means, means connecting in series said higher voltage connections, said last-named normally open contact means and said coil means of said time delay relay means, current responsive means for actuating said switch means to close, means including said normally open contact means of said time delay relay means for connecting said actuating means to said power supply means, normally closed switch means, means cooperative with said actuating means for actuating said normally closed switch means to open when said normally open switch means is actuated to close, and means for connecting in series said first connections, said normally closed switch means, said coil means of said additional relay means and said first and second conductors.

11. An arc welder comprising power supply means having a first supply terminal and a second supply terminal, an auxiliary transformer having a secondary having first connections from which a low voltage is derivable and second connections from which a higher voltage is derivable, a first load conductor and a second load conductor through which the welding current flows, normally open first switch means, means connecting said first switch means between said first terminal and said first conductor, means connecting said second terminal and said second conductor, time delay relay means having coil means and normally open contact means, additional relay means having coil means and normally open contact means, means connecting in series said higher voltage connections, said last-named normally open contact means and said coil means of said time delay relay means, current responsive means for actuating said first switch means to close, means including said normally open contact means of said time delay relay means for connecting said actuating means to said power supply means, normally closed switch means, means cooperative with said actuating means for actuating said normally closed switch means to open when said normally open first switch means is actuated to close, normally open second switch means, means cooperative with said actuating means for said normally open first switch means for actuating said second switch means to close when said first switch means closes, means including said second switch means for connecting said coil means of said additional relay between said first terminal and said first conductor, and means for connecting in series said first connections, said normally closed switch means, said coil means of said additional relay means and said first and second conductors.

12. An arc welder comprising power supply means having a first supply terminal and a second supply terminal, an auxiliary transformer having a secondary having first connections from which a low voltage is derivable and second connections from which a higher voltage is derivable, a first load conductor and a second load conductor through which the welding current flows, another auxiliary transformer having a secondary having third and fourth output connections, normally open switch means, means connecting said switch means between said first terminal and said first conductor, means connecting said second terminal and said second conductor, time delay relay means having coil means and normally open contact means, first additional relay means having coil means and normally open contact means, means connecting in series said higher voltage connections, said last-named normally open contact means and said coil means of said time delay relay means, current responsive means for actuating said switch means to close, means including said normally open contact means of said time delay relay means for connecting said actuating means to said power supply means, means for connecting in series said first connections, said coil means of said first additional relay means and said first and second conductors, second additional relay means having coil means and normally open contact means, second time delay means having coil means and normally open contact means, means connecting said third terminal to the junction of said first terminal and said switch means, means connecting said fourth terminal to said second conductor, means connecting said coil means of said second additional relay means between said third and fourth conductors, means including said normally open contact means of said second additional relay means for connecting said coil means of said second time delay relay between said third and fourth terminals, and means including said normally open contact means of said second time delay relay for connecting said second transformer to said power supply means.

13. Arc welding apparatus comprising power supply means for supplying an alternating potential and having a first supply terminal and a second supply terminal, a first autotransformer connected between said first terminal and said second terminal and having low voltage connections, a first load conductor and a second load conductor through which welding current is to flow, first normally open switch means, means for connecting said switch means between said first terminal and said first conductor, means connecting said second terminal to said second conductor, a second autotransformer having a primary connection connected to said power supply means, a first relay having a coil and normally open contact means, a second relay having a coil and normally open contact means, current responsive actuating means for said switch means, second normally open switch means, normally closed switch means, means including said contact means of said first relay for connecting said actuating means to said power supply, rectifier means, means for connecting in series said secondary connections, said rectifier means, said coil of said first relay, and said contact means of said second relay, means for connecting in series said first conductor, said second conductor, said normally closed switch means, said coil of said second relay, and said low voltage connections, means including said second switch means for connecting said coil of said second relay between said first terminal and said first conductor, means responsive to said actuating means when it is actuated for closing said second switch means and opening said normally closed switch means, a capacitor, and means for connecting said capacitor in parallel with said coil of said first relay.

14. Arc welding apparatus comprising power supply means for supplying an alternating potential and having a first supply terminal and a second supply terminal, a first autotransformer connected between said first terminal and said second terminal and having low voltage connections, a first load conductor and a second load conductor through which welding current is to flow, first normally open switch means, means for connecting said switch means between said first terminal and said first conductor, a second autotransformer having primary connections connected to said power supply means, a first relay having a coil and normally open contact means, said first relay being of the type that picks up immediately on being supplied with current but drops out a predetermined time interval after said current is interrupted, a second relay having a coil and normally open contact means, current responsive actuating means for said switch means, second normally open switch means, normally closed switch means, means including said contact means of said first relay for connecting said actuating means to said power supply, means for connecting in series said secondary connections, said coil of said first relay, and said contact means of said second relay, means for connecting in series said first conductor, said second conductor, said normally closed switch means, said coil of said second relay and said low voltage connections, means including said second switch means for connecting said coil of said second relay between said first terminal and said first conductor, and means responsive to said actuating means when it is actuated for closing said second switch means and opening said normally closed switch means.

15. Arc welding apparatus comprising power supply means for supplying an alternating potential and having a first supply terminal and a second supply terminal, an autotransformer connected between said first terminal and said second terminal and having low voltage connections, a first load conductor and a second load conductor through which welding current is to flow, first normally open switch means, means for connecting said switch means between said first terminal and said first conductor, means having third and fourth terminals connected to said power supply means for deriving a potential between said third and fourth terminals, a first relay having a coil and normally open contact means, a second relay having a coil and normally open contact means, current responsive actuating means for said switch means, second normally open switch means, normally closed switch means, means including said contact means of said first relay for connecting said actuating means to said power supply, rectifier means, means for connecting in series said third and fourth terminals, said rectifier means, said coil of said first relay, and said contact means of said second relay, means for connecting in series said first conductor, said second conductor, said normally closed switch means, said coil of said second relay, and said low voltage connections, means including said second switch means for connecting said coil of said second relay between said first terminal and said first conductor, means responsive to said actuating means when it is actuated for closing said second switch means and opening said normally closed switch means, a capacitor, and means for connecting said capacitor in parallel with said coil of said first relay.

16. Arc welding apparatus comprising power supply means for supplying an alternating potential and having a first supply terminal and a second supply terminal, an autotransformer connected between said first terminal and said second terminal and having low voltage connections, a first load conductor and a second load conductor through which welding current is to flow, first normally open switch means, means for connecting said switch means between said first terminal and said first conductor, means having third and fourth terminals connected to said power supply means for deriving a potential between said third and fourth terminals, a first relay having a coil and normally open contact means, a second relay having a coil and normally open contact means, current responsive actuating means for said switch means, means including said contact means of said first relay for connecting said actuating means to said power supply, rectifier means, means for connecting in series said third and fourth terminals, said rectifier means, said coil of said first relay, and said contact means of said second relay, means for connecting in series said first conductor, said second conductor, said coil of said second relay, and said low voltage connections, means responsive to said actuating means when it is actuated for opening the connection between said low voltage connections and said load conductors, means responsive to said actuating means when it is actuated for locking said coil of said second relay in energized condition, a capacitor, and means for connecting said capacitor in parallel with said coil of said first relay.

17. Arc welding apparatus comprising power supply means for supplying an alternating potential and having a first supply terminal and a second supply terminal, a first autotransformer connected between said first terminal and said second terminal and having low voltage connections, a first load conductor and a second load conductor through which welding current is to flow, first normally open switch means, means for connecting said switch means between said first terminal and said first conductor, a second autotransformer having secondary connections connected to said power supply means, a first relay having a coil and normally open contact means, said first relay being of the type that picks up immediately on being supplied with current but drops out a predetermined time interal after said current is interrupted, a second relay having a coil and normally open contact means, current responsive actuating means for said switch means, means including said contact means of said first relay for connecting said actuating means to said power supply, means for connecting in series said secondary connections, said coil of said first relay, and said contact means of said second relay, means for connecting in series said first conductor, said second conductor, said coil of said second relay, and said low voltage connections, means responsive to said actuating means when it is actuated for opening the connection between said low voltage connections and said load conductors, and means responsive to said actuating means when it is actuated for locking in said coil of said second relay in energized condition.

18. An arc welder comprising power supply means having a first supply terminal and a second supply terminal, an auxiliary transformer having a secondary having first connections from which a low voltage is derivable and second connections from which a higher voltage is derivable, a first load conductor and a second load conductor through which the welding current flows, normally open switch means, means connecting said switch means between said first terminal and said first conductor, means connecting said second terminal and said second conductor, time delay relay means having coil means and normally open contact means, additional relay means having coil means and normally open contact means, means connecting in series said higher voltage connections, said last-named normally open contact means and said coil means of said time delay relay, current responsive means for actuating said switch means to close, means including said normally open contact means of said time delay relay for connecting said actuating means to said power supply means, means for connecting in series said first connections, said coil means of said additional relay means and said first and second conductors, means responsive to the actuation of said actuating means for interrupting said connection between said low voltage connection and said load conductors, and means responsive to the actuation of said actuating means for locking in said coil means of said additional relay means.

19. An arc welder for welding work with an electrode and including a main circuit for supplying current for welding and having a predetermined open circuit potential and means for connecting said main circuit between said electrode and said work; said welder being characterized by an auxiliary circuit for supplying current and having an open circuit potential substantially equal to said predetermined potential, by first time delay means responsive to the potential between said electrode and said work for maintaining said auxiliary circuit connected in parallel with said main circuit ready to supply current cumulatively to said work in the standby condition of said welder and for opening said auxiliary circuit a first predetermined time interval after an arc is struck between said electrode and said work and by second time delay means responsive to the current flowing in said auxiliary circuit for opening said auxiliary circuit if the current flow therein persists for a second predetermined time interval longer than said first interval.

20. An arc welder comprising a first pair of supply terminals between which a potential adequate to strike an arc is to be supplied, a second pair of supply terminals between which a potential which does not endanger personnel is to be supplied, a pair of load terminals between which an arc is to be produced, normally open main switch means, means directly connecting in series said first pair of supply terminals, said main switch means and said pair of load terminals, main current responsive means for closing said main switch means, normally open auxiliary switch means, an energizing circuit for said main current responsive means including in series said auxiliary switch means, auxiliary current responsive means for actuating said auxiliary switch means, and means directly connecting in a series circuit said second supply terminals, said load terminals and said auxiliary current responsive means, the said auxiliary responsive means being actuated by flow of current in said series circuit, the said arc welder being characterized by means cooperative with said auxiliary current responsive means and said auxiliary switch means for delaying the opening of said auxiliary switch means, once it has been closed, by a predetermined time interval after the flow of current through said series circuit has stopped.

References Cited in the file of this patent

UNITED STATES PATENTS

| | | |
|---|---|---|
| 2,192,555 | Morelisse | Mar. 5, 1940 |
| 2,364,372 | Kenrick | Dec. 5, 1944 |
| 2,486,165 | Journeaux | Oct. 25, 1949 |
| 2,573,901 | Girard et al. | Nov. 6, 1951 |
| 2,634,355 | Girard | Apr. 7, 1953 |